United States Patent
Dow et al.

(10) Patent No.: US 9,304,697 B2
(45) Date of Patent: *Apr. 5, 2016

(54) COMMON CONTIGUOUS MEMORY REGION OPTIMIZED VIRTUAL MACHINE MIGRATION WITHIN A WORKGROUP

(71) Applicant: International Business Machines Corporation, Armonk, NY (US)

(72) Inventors: Eli M. Dow, Norwood, NY (US); James P. Gilchrist, Poughkeepsie, NY (US); Steven K. Schmidt, Essex Junction, VT (US); Jessie Yu, Wappinger Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/726,692

(22) Filed: Jun. 1, 2015

(65) Prior Publication Data

US 2015/0261582 A1 Sep. 17, 2015

Related U.S. Application Data

(60) Division of application No. 14/090,490, filed on Nov. 26, 2013, which is a continuation of application No. 13/690,107, filed on Nov. 30, 2012.

(51) Int. Cl.
*G06F 9/455* (2006.01)
*G06F 3/06* (2006.01)
(Continued)

(52) U.S. Cl.
CPC .............. *G06F 3/0619* (2013.01); *G06F 3/065* (2013.01); *G06F 3/067* (2013.01); *G06F 3/0647* (2013.01); *G06F 9/00* (2013.01); *G06F 9/45558* (2013.01); *G06F 9/5016* (2013.01);
(Continued)

(58) Field of Classification Search
None
See application file for complete search history.

(56) References Cited

U.S. PATENT DOCUMENTS

| 6,075,938 | A  | 6/2000 | Bugnion et al. |
| 7,500,048 | B1 | 3/2009 | Venkitachalam et al. |
| 7,529,867 | B2 | 5/2009 | McCrory et al. |

(Continued)

OTHER PUBLICATIONS

A. F. Benner et al., "Exploitation of Optical Interconnects in Future Server Architectures," IBM J. Res. & Dev., v.49, n.4/5, pp. 755-775, Jul./Sep. 2005.

(Continued)

*Primary Examiner* — Sisley Kim
(74) *Attorney, Agent, or Firm* — Cantor Colburn LLP; Steven Chiu (57) ABSTRACT

Embodiments relate to a method for migrating a virtual machine from a first processor to a second processor in a work group. The method includes determining a minimum hardware configuration to support the virtual machine. A list of one or more candidate processors in the work group is constructed. For each of the one or more candidate processors information about shared contiguous memory regions accessible to the candidate processor that is in common to contiguous memory regions accessed by the virtual machine is determined. The virtual machine is migrated to the second processor based on the determination of the information about shared contiguous memory regions accessible to each of the one or more candidate processors that are in common to contiguous memory regions accessed by the virtual machine. The migrating includes moving contiguous memory regions that are not in common between the first processor and the second processor.

3 Claims, 7 Drawing Sheets

(51) Int. Cl.
  *G06F 9/00* (2006.01)
  *G06F 9/50* (2006.01)

(52) U.S. Cl.
  CPC .......... *G06F 9/5077* (2013.01); *G06F 9/5088* (2013.01); *G06F 2009/4557* (2013.01)

(56) References Cited

U.S. PATENT DOCUMENTS

| | | |
|---|---|---|
| 7,620,766 B1 | 11/2009 | Waldspurger |
| 8,112,610 B2 | 2/2012 | Oshins et al. |
| 8,239,863 B2 | 8/2012 | Bhat et al. |
| 8,689,211 B2 | 4/2014 | Agbaria et al. |
| 2007/0266383 A1 | 11/2007 | White |
| 2009/0063749 A1 | 3/2009 | Dow |
| 2009/0150529 A1* | 6/2009 | Tripathi .................. G06F 9/455 709/222 |
| 2009/0204718 A1* | 8/2009 | Lawton ................. G06F 9/5077 709/230 |
| 2010/0332657 A1 | 12/2010 | Elyashev et al. |
| 2011/0131568 A1 | 6/2011 | Heim |
| 2011/0131571 A1* | 6/2011 | Heim .................. G06F 9/45558 718/1 |
| 2011/0161491 A1 | 6/2011 | Sekiguchi |
| 2012/0254864 A1 | 10/2012 | Bork et al. |

OTHER PUBLICATIONS

Gregor Rebel, "A Virtual Platform for High Speed Message-Passing-Hardware Research," Thesis, Universität Dortmund, Mar. 2009, 88 pages.

Jian Wang, "Survey of State-of-the-Art in Inter-VM Communication Mechanisms," Sep. 27, 2009, 25 pages, http://www.cs.binghamton.edu/~jianwang/papers/proficiency.pdf.

Peter Mell et al., "The NIST Definition of Cloud Computing," Version 15; p. 1-2; Oct. 7, 2009.

U.S. Appl. No. 13/690,107; Final Office Action; Date Filed: Nov. 30, 2012; Date Mailed: Mar. 20, 2015; 27 pages.

U.S. Appl. No. 13/690,107; Non-Final Office Action, Date Filed: Nov. 30, 2012; Date Mailed: Nov. 13, 2014; 22 pages.

U.S. Appl. No. 14/090,490; Non-Final Office Action; Date Filed: Nov. 26, 2014; Date Mailed: Nov. 5, 2014; 46 pages.

* cited by examiner

COMMON CONTIGUOUS MEMORY REGION OPTIMIZED VIRTUAL MACHINE MIGRATION WITHIN A WORKGROUP

DOMESTIC PRIORITY

This application is a divisional of U.S. patent application Ser. No. 14/090,490 filed Nov. 26, 2013 which is a continuation of U.S. patent application Ser. No. 13/690,107, filed Nov. 30, 2012, the disclosures of which are incorporated by reference herein in their entirety.

BACKGROUND

The present invention relates to management of virtual machines (VMs), and more specifically, to a common contiguous memory region optimized VM migration within a work group.

Providers of cloud computing have the competing tasks of providing desired performance for consumers or end users while also efficiently allocating the resources used to provide services to consumers. The resources may be dynamically allocated by the provider to help achieve these goals. Accordingly, a hardware platform may host a plurality of virtual machines, wherein each virtual machine corresponds to a consumer. Efficient use of the hardware platform resources dictates that the provider place as many virtual machines on the platform as possible without compromising the consumer's use of the virtual machine and experience. It may be desirable to move or migrate a virtual machine from one hardware platform to another to ensure that the customer is not adversely affected by changes in resources for the virtual machines.

SUMMARY

An embodiment is directed to a method for migrating a virtual machine from a first processor to a second processor in a work group. The method comprises determining a minimum hardware configuration to support the virtual machine. The method comprises constructing a list of one or more candidate processors in the work group to migrate the virtual machine to, wherein each of the one more candidate processors supports the minimum hardware configuration, and wherein the list of one or more candidate processors comprises the second processor. The method comprises determining for each of the one or more candidate processors information about shared contiguous memory regions accessible to the candidate processor that is in common to contiguous memory regions accessed by the virtual machine. The method comprises migrating the virtual machine from the first processor to the second processor based on the determination of the information about shared contiguous memory regions accessible to each of the one or more candidate processors that are in common to contiguous memory regions accessed by the virtual machine, wherein the migrating comprises moving contiguous memory regions that are not in common between the first processor and the second processor. An embodiment is directed to a method comprising scanning, by a first processor in a work group, a memory associated with the first processor for data. The method comprises updating, by the first processor, a first data structure to include at least a portion of the data based on the scanning. The method comprises transmitting, by the first processor, a representation of the first data structure to one or more peer processors of the first processor included in the work group using a dedicated link. The method comprises receiving, by the first processor, a representation of a second data structure associated with at least one of the one or more peer processors of the first processor. The method comprises updating, by the first processor, the first data structure based on the received representation of the second data structure.

An embodiment is directed to an apparatus comprising at least one processing device, and a storage device. The storage devices has instructions stored thereon that, when executed by the at least one processing device, cause the apparatus to scan a memory associated with the apparatus for strings of data. The instructions, when executed, cause the apparatus to update a first data structure based on the scan. The instructions, when executed, cause the apparatus to transmit a representation of the first data structure to one or more peer processors of the apparatus included in a work group. The instructions, when executed, cause the apparatus to receive a representation of a second data structure associated with at least one of the one or more peer processors of the apparatus. The instructions, when executed, cause the apparatus to update the first data structure based on the received representation of the second data structure.

An embodiment is directed to a computer program product comprising a computer readable storage medium having computer readable program code embodied therewith. The computer readable program code comprises computer readable program code configured for receiving a request from a virtual machine to migrate the virtual machine from a first processor. The computer readable program code is configured for determining a minimum hardware configuration to support the virtual machine responsive to the request. The computer readable program code is configured for constructing a list of one or more candidate processors in a work group to migrate the virtual machine to, wherein each of the one more candidate processors supports the minimum hardware configuration. The computer readable program code is configured for determining for each of the one or more candidate processors information about shared contiguous memory regions accessible to the candidate processor that is in common to contiguous memory regions accessed by the virtual machine. The computer readable program code is configured for migrating the virtual machine from the first processor to a second processor included in the list of one or more candidate processors based on the determination of the information about shared contiguous memory regions accessible to each of the one or more candidate processors that are in common to contiguous memory regions accessed by the virtual machine.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Embodiments described herein are directed to common contiguous memory region optimized virtual machine (VM) migration within a workgroup, where commonality of contiguous memory regions between a processor currently executing a VM and candidate target processors for executing the VM is taken into account when determining a target processor for the VM. In some embodiments, only those contiguous memory regions that are not already replicated on the target processor are transferred as part of the VM migration. In embodiments, a dedicated link is used to share the information relating to duplicate contiguous memory region content and/or for migrating the memory contents of the VM to the target processor. As used herein, the term "workgroup" refers to a cluster of processors or machines. As used herein the term "dedicated link" refers to a link or communication channel for transferring memory contiguous memory regions, or data or metadata associated therewith, between two or more machines or processors.

Embodiments described herein include a bus designed to share information or data in an arrangement. In some embodiments, the arrangement takes the form of a hypervisor common contiguous memory region message bus configured to share the information as part of a cluster or work group. In some embodiments, the bus is implemented over a transport (e.g., a Transmission Control Protocol/Internet Protocol (TCP/IP) transport) or some other hardware mechanism. In some embodiments, a dedicated link (e.g., fiber cable) is used to enable a quick, secure transfer between two trusted or physically close machines, such as two peer machines. The link may be used to share information or data about common contiguous memory region replication, which may include metadata about a given contiguous memory region and how many times it is replicated on a given machine, with other machines in a work group or cluster.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed (e.g., any client-server model).

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
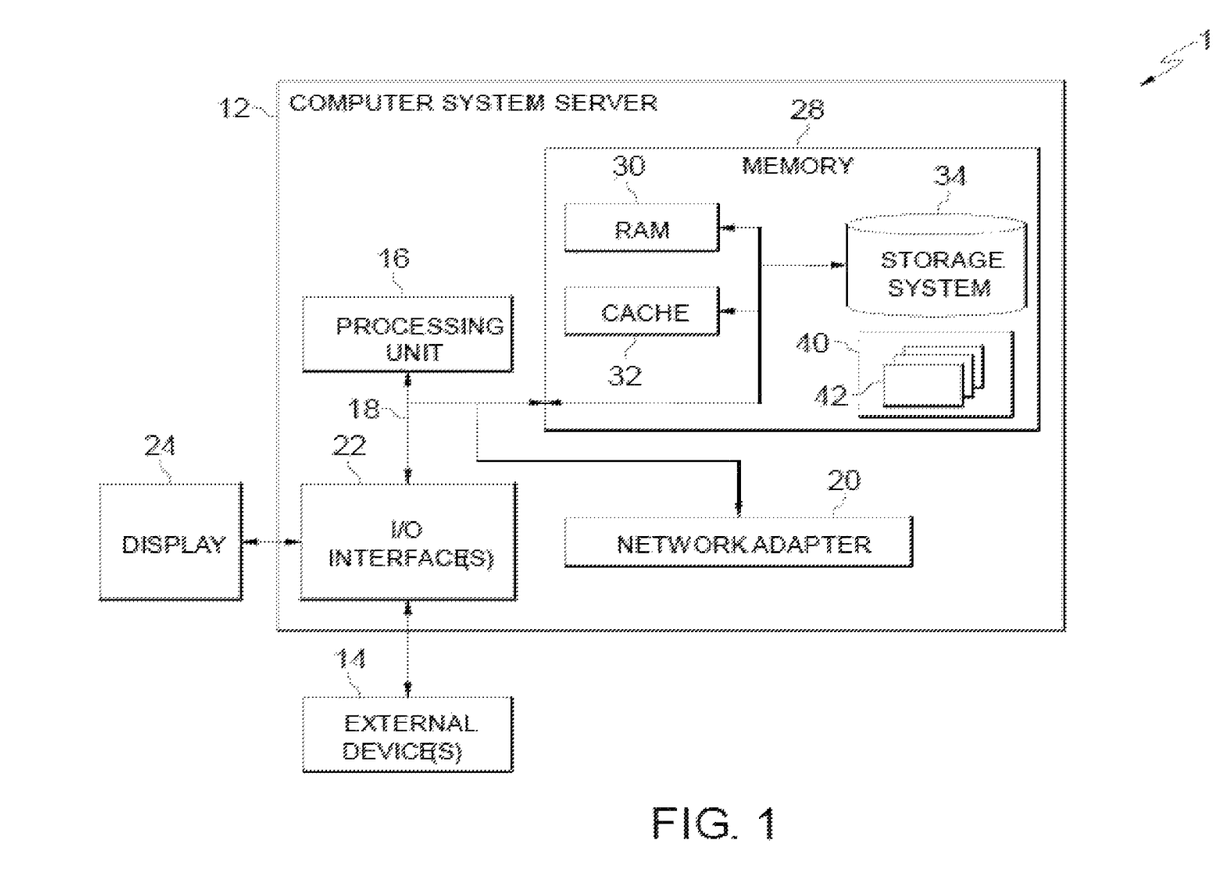
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
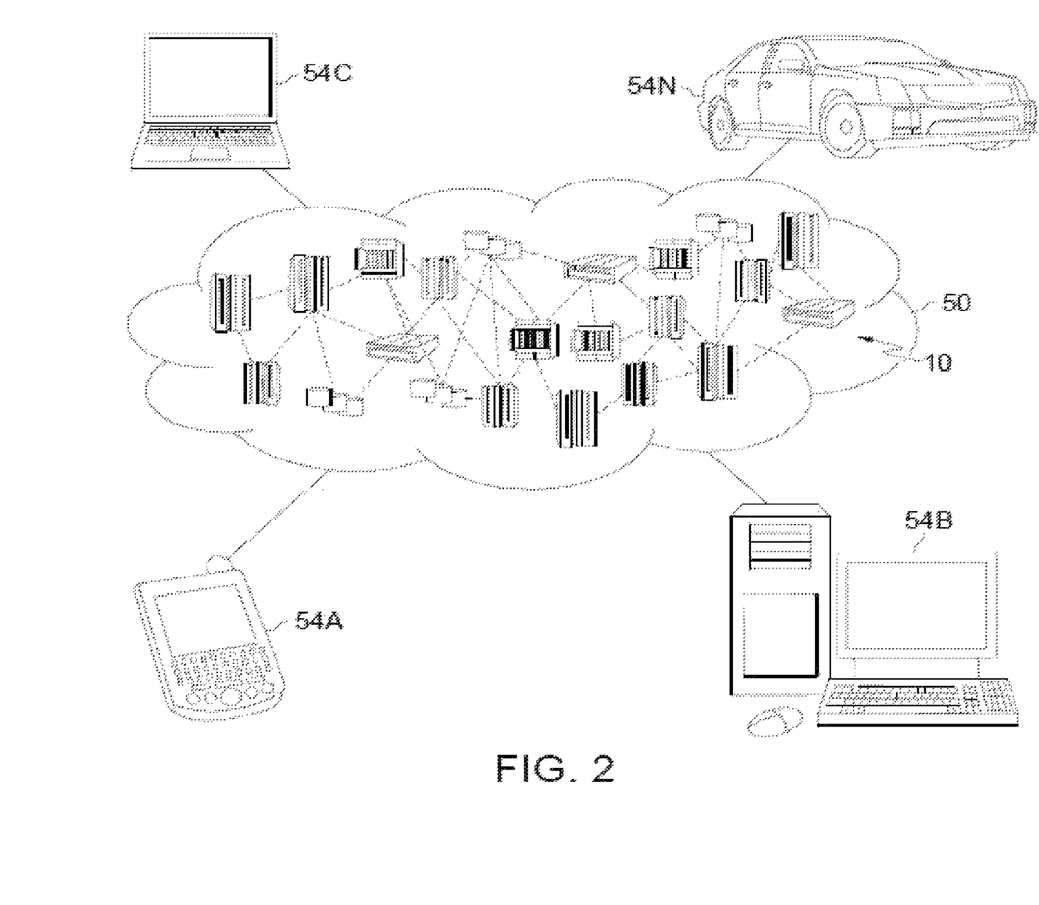
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
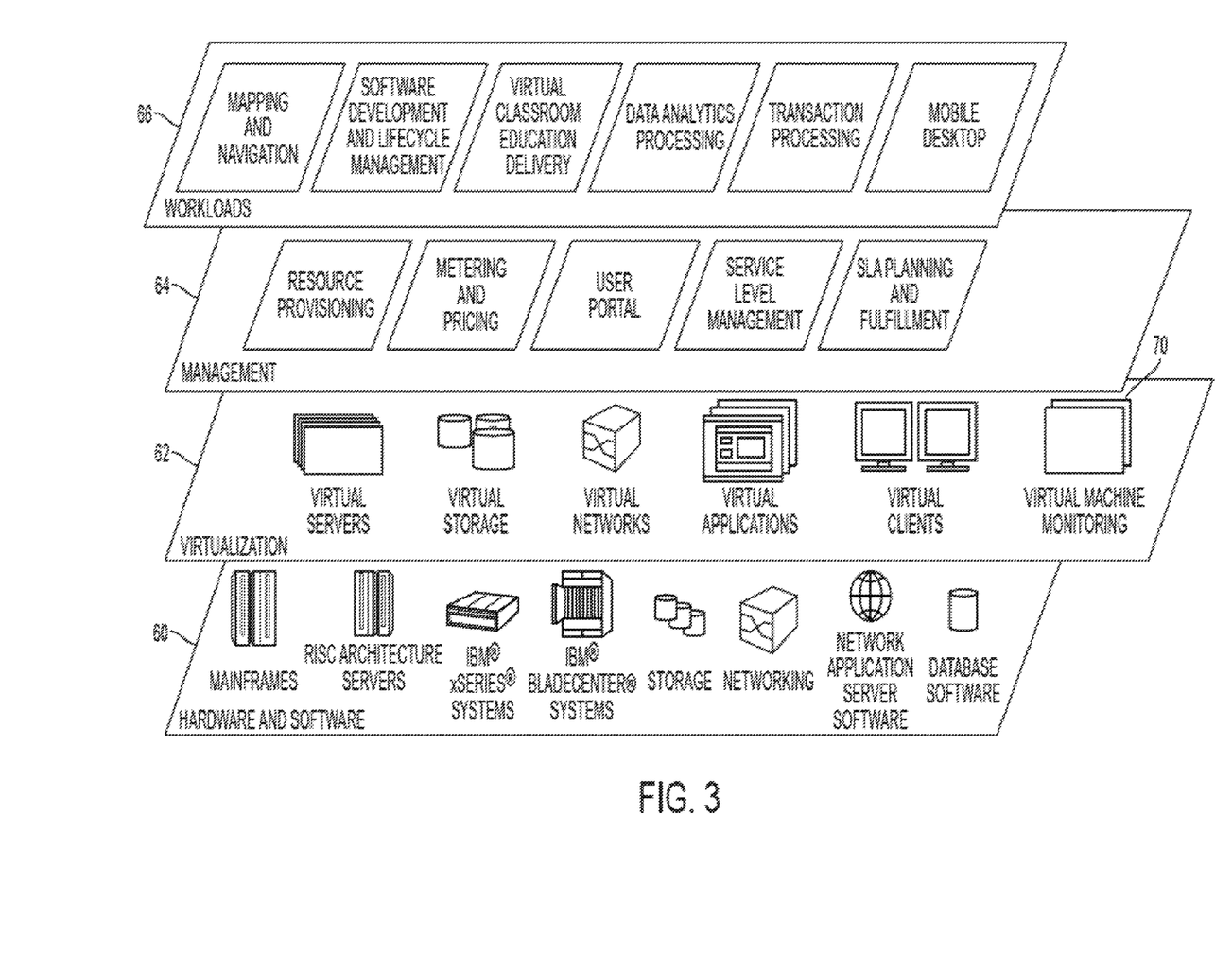
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security (not shown) provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a mobile desktop for mobile devices (e.g., 54A, 54C, and 54N, as well as mobile nodes 10 in cloud computing environment 50) accessing the cloud computing services.

In one embodiment, one or both of the hardware and software layer 60 and the virtualization layer 62 may include edge components, such as a web server front end and image cache, as well as an image library store, e.g., in a high-performance RAID storage area network (SAN). In an exemplary embodiment, an application, such as a virtual machine monitoring application 70 in the virtualization layer 62, may implement a process or method for determining whether to migrate one or more virtual machines; however, it will be understood that the application 70 may be implemented in any layer. In some embodiments, the application 70 may select which virtual machine(s) to migrate, and/or one or more destinations for a migrating virtual machine.

Figure 4:
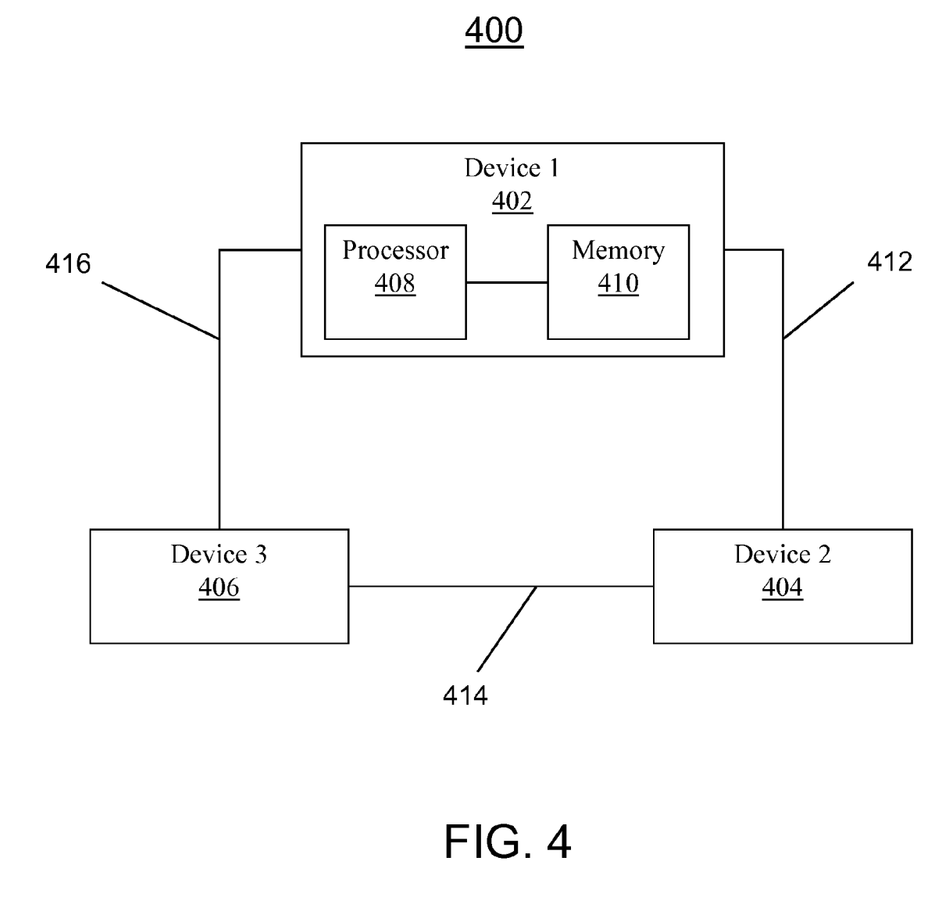
FIG. 4 illustrates an exemplary computing system of a work group in accordance with an embodiment.

Turning now to FIG. 4, a computing system or environment 400 in accordance with an embodiment is shown. The system 400 may be indicative of a cluster or work group.

The system 400 includes three devices, device 1 402, device 2 404, and device 3 406. The devices 402, 404, and 406 may be configured to communicate with one another. For example, the devices 402, 404, and 406 may be configured to communicate with one another over wired or wireless connections. While the system 400 is shown as including three devices, in some embodiments more or fewer than three devices may be included. In some embodiments, one or more of the devices 402, 404, and 406 may include, or be associated with, one or more of the entities described above in connection with FIGS. 1-3.

One or more of the devices 402, 404, and 406 may include one or more components. For example, the device 402 is shown in FIG. 4 as including a processor 408 and memory 410. In some embodiments, the processor 408 may correspond to the processing unit 16 of FIG. 1. In some embodiments, the memory 410 may correspond to the memory 28 of FIG. 1. The memory 410 may be configured to store data or information. The memory 410 may have instructions stored thereon that, when executed by the processor 408, cause the device 402 to perform one or more methodological acts, such as those described herein. In some embodiments, the device 402 may include more than one processor 408. The device 402 may include additional components not shown in FIG. 4. For example, the device 402 may include a transceiver to facilitate communications with the devices 404 and 406.

The device 402 is shown in FIG. 4 as being coupled to the device 404 via a link 412. The device 404 is shown in FIG. 4 as being coupled to the device 406 via a link 414. The device 406 is shown as being coupled to the device 402 via a link 416. In some embodiments, one or more of the links may be optional. For example, if link 416 is omitted, then the device 402 and the device 406 might not communicate with one another, or may communicate with one another via the device 404 serving as an intermediary or router between the devices 402 and 406.

One or more of the links 412, 414, and 416 may correspond to a TCP/IP connection or a dedicated hardware link. The links 412, 414, and 416 may be used to share information about, e.g., replicated contiguous memory regions stored on the machines/devices 402, 404, and 406. The sharing of replicated contiguous memory region information may take place separately from "normal" network traffic. For example, the sharing of replicated contiguous memory region information may occur using out-of-band communications. Alternatively, in-band communications may be used to communicate, e.g., replicated contiguous memory region information. The replicated contiguous memory region information may be updated at predetermined intervals (e.g., periodically) to ensure that the information is fresh or up-to-date.

One or more of the devices 402, 404, and 406 may track a number of chunks of memory (e.g., memory 410) that are replicated in the memory in an amount greater than a threshold. As used herein, the term "chunks of memory" refers to one or more regions of memory. A chunk of memory may be contiguous or non-contiguous. The chunks of memory may be stored as part of, or in connection with, a data structure (e.g., a chained hash table or map). The contents of the memory may serve as a key and the size of a chunk of memory, potentially in relation to a unique page number, and offset, and the number of occurrences may be stored as a value.

When storing the data in the data structure, a check may be performed to ensure that there are no collisions in the data structure. In some embodiments, an entry in the data structure takes the form:

A-B-C-D-E, where A serves as a status bit that represents whether a nominal size page or not is being referenced, B serves as an indication as to the size of the chunk of memory, C represents the data content or payload of the chunk of memory, D represents an identifier of a device or machine in question, and E represents the number of times the data content or payload is replicated on the machine in question. Thus, in some embodiments the value:

0-2-0x0010-A1-50, signifies that: a fraction of a page is being referenced (A=0), the size of the chunk of memory is half a page (B=2, which when taken together with A=0, may represent a "1-over-value" or fraction of the nominal system page size), the data payload or memory content is "0x0010" (C=0x0010), that the device in question is identified by identifier A1 (D=A1), and that the data payload of "0x0010" is replicated fifty times on the device A1 (E=50).

Similarly, in some embodiments the value:

1-3-0x0400-A2-30, signifies that: a nominal size page is being referenced (A=1), the size of the chunk of memory is three pages (B=3, when taken together with A=1), the data payload or memory content is "0x0400" (C=0x0400), that the device in question is identified by identifier A2 (D=A2), and that the data payload of "0x0400" is replicated thirty times on the device A2 (E=30).

To communicate the 'A-B-C-D-E' indicators from a first machine to a second machine in a cluster or work group, the page size of the first and second machines, and a minimum length of memory to be considered may need to be established. The page size of each of the machines may be transmitted over a channel or link (e.g., links 412, 414, or 416 of FIG. 4).

The system 400 described above may be used to perform a machine migration (e.g., a VM migration). When a machine (e.g., device 402) is to be migrated, a determination may be made regarding the minimum amount of storage and hardware power (e.g., processing power) the machine needs to work.

If the machine to be migrated (e.g., device 402) finds one or more candidate machines (e.g., devices 404 and 406) in its work group with the necessary storage and hardware power, a determination may be made regarding which of the candidate machines will minimize the amount of memory or memory state to be transferred (assuming more than one candidate machine is identified). Such a determination may be based on a consultation of a list of, e.g., map, hash tables, where each map, table is as described above, one such data structure for each machine in the work group or cluster. A migration may then be performed to the candidate machine that: a) has sufficient hardware power, b) has sufficient storage space available, and c) has the most commonly replicated contiguous memory regions as the origin machine (e.g., device 402).

Figure 5:
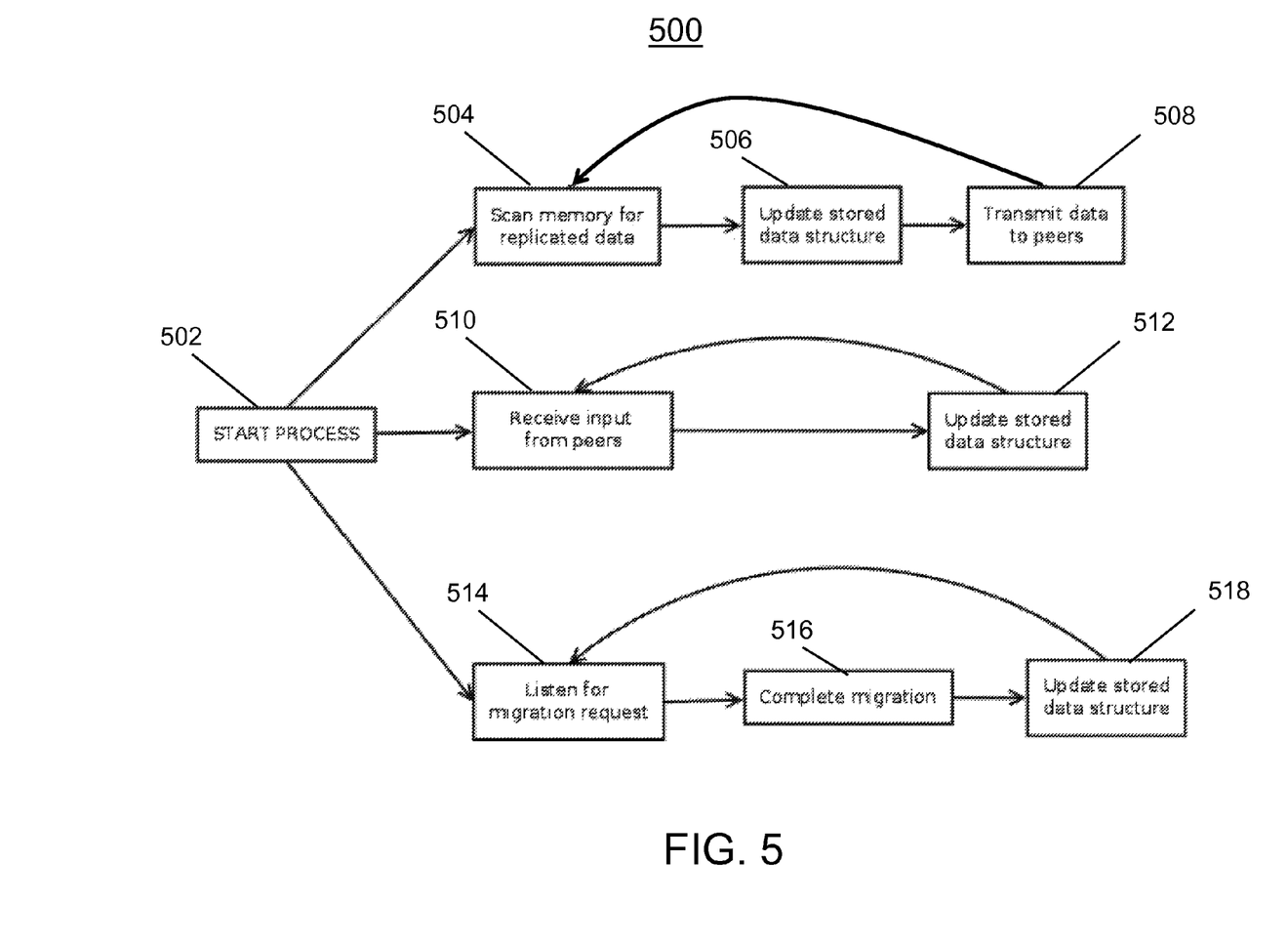
FIG. 5 illustrates a process flow for characterizing a memory environment in accordance with an embodiment.

Turning now to FIG. 5, a flow chart of an exemplary method 500 in accordance with an embodiment is shown. The method 500 may execute in connection with one or more systems, devices, or components, such as those described herein. In some embodiments, the method 500 may execute in connection with the application 70 of FIG. 3.

The method 500 may generally start at block 502. From block 502, flow may proceed to one of three loops, where a first of the loops is denoted by blocks 504-508, a second of the loops is denoted by blocks 510-512, and a third of the loops is denoted by blocks 514-518. In some embodiments, the three loops may execute sequentially or in turn, although not necessarily with the same frequency. In some embodiments, the three loops may execute concurrently or in parallel with one another. In some embodiments, a loop may execute in response to one or more input events or conditions.

The first loop may be used to convey status regarding replicated data on a first machine in a work group or cluster to one or more other machines in the work group. In block 504, the first machine may scan its memory for replicated data. In block 506, the first machine may establish or update a stored data structure to reflect the results of the scan of block 504. In block 508, the first machine may transmit the data structure associated with block 506, or a representation of the data structure associated with block 506 to one or more other machines or peers in the work group. In this manner, peer machines in the work group may gain insight into the data that is stored on the first machine.

The second loop may be used to receive, at the first machine, information regarding data stored at one or more other machines or peers in the work group. In block 510, the first machine may receive input from the peer machine(s) in the work group. The input of block 510 may include one or more data structures associated with the peer machine(s), or one or more representations of such data structures. In block 512, the first machine may update a data structure associated with the first machine to reflect the input of block 510. In this manner, the first machine may obtain insight into the data that is stored at peer machine(s) in the work group.

The third loop may be used to enable the first machine to serve as a destination of a migration operation with respect to one or more other machines or peers in the work group. In block 514, the first machine may listen for a migration request from one or more peer machines in the work group. When a migration request is received, flow may proceed from block 514 to 516 to complete the migration to the first machine. In block 518, a data structure associated with the first machine may be updated to reflect the contents of the data received as part of the migration.

Figure 6:
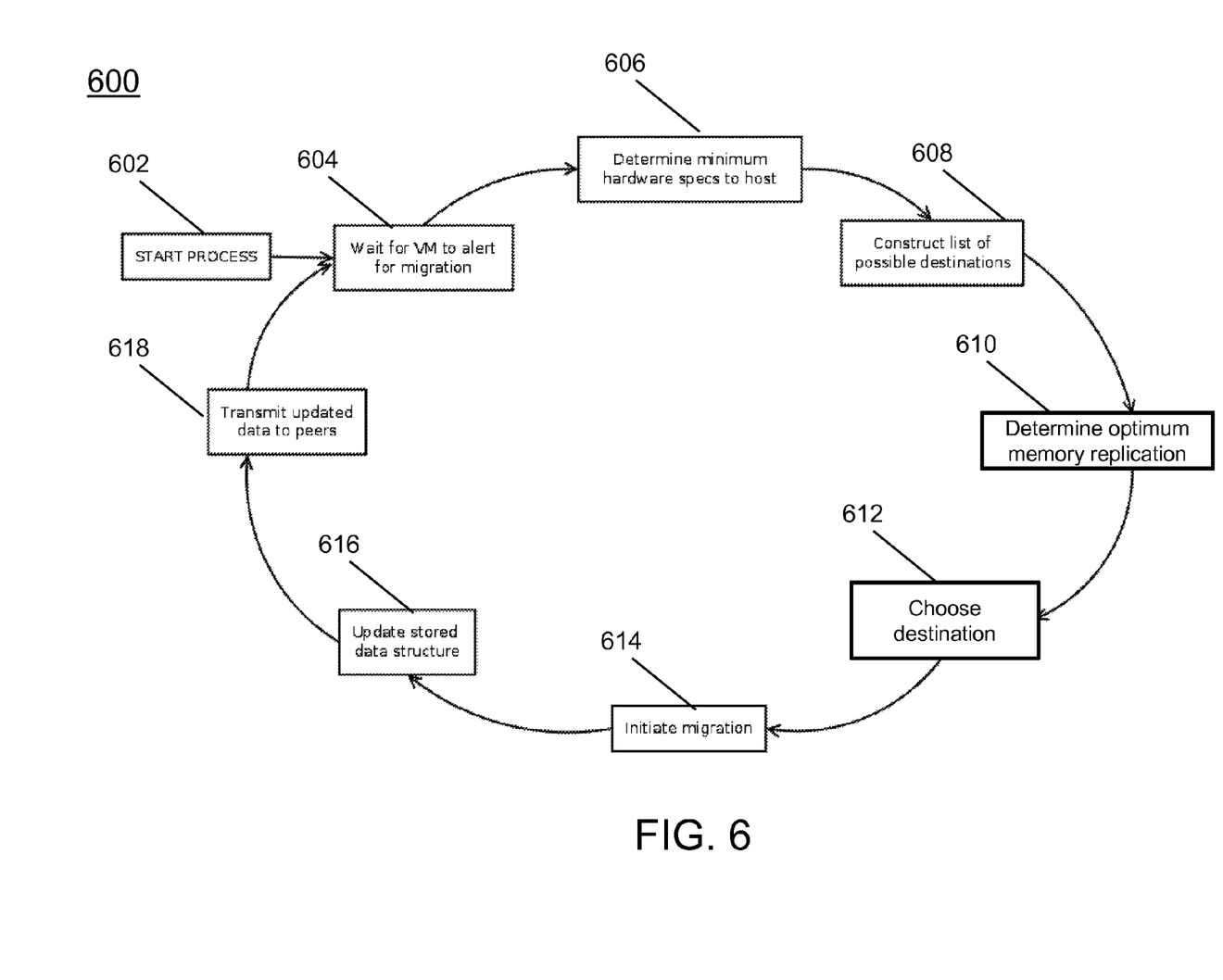
FIG. 6 illustrates a process flow for migration a virtual machine in accordance with an embodiment.

Turning now to FIG. 6, a flow chart of an exemplary method 600 in accordance with an embodiment is shown. The method 600 may execute in connection with one or more systems, devices, or components, such as those described herein. In some embodiments, the method 600 may execute in connection with the application 70 of FIG. 3. The method 600 may be used to migrate a VM from a first machine to a second machine.

The method 600 may generally start at block 602. From block 602, flow may proceed to block 604.

In block 604, the method 600 may wait until a request (e.g., a signal, message, alert, etc.) is received that indicates a migration of a VM from the first machine is to occur. The request may be issued by the VM or another entity. From block 604, flow may proceed to block 606. When communication between nodes has been established, the candidate lists can synchronize in the background. Performing this background synchronization amortizes compute cost that would otherwise be incurred at the time of migration.

In block 606, a determination may be made regarding minimum specifications to host the migrating VM. Such minimum specifications may include hardware specifications or configurations, such as processing capacity or power and memory capacity or availability. From block 606, flow may proceed to block 608.

In block 608, a list of candidate destination machines may be constructed. The list may be constructed based on the results of block 606, such that those machines that fail to meet the minimum specifications might not be included in the list. From block 608, flow may proceed to block 610.

In block 610, an optimum memory replication may be determined. For example, a memory replication scheme may be selected to minimize the amount or number of contiguous memory regions or data that need to be transferred to, or obtained at, a destination machine. A priority scheme may be used to obtain those contiguous memory regions that are critical to the execution of the VM, whereas an obtaining of lower priority contiguous memory regions may be deferred. Startup time may also be taken into consideration when determining how or when to obtain a given contiguous memory region. From block 610, flow may proceed to block 612.

In block 612, a destination machine (e.g., the second machine) may be selected to receive the migrating VM. The destination may be selected based on one or more factors, such as availability of resources, capabilities of resources, load, anticipated migration time, commonality in terms of replicated contiguous memory regions between the first machine and the destination machine, etc. From block 612, flow may proceed to block 614.

In block 614, the migration of the VM from the first machine to the destination machine may be initiated. From block 614, flow may proceed to block 616.

In block 616, a data structure may be updated to reflect the results of the VM having been migrated to the destination machine. For example, any contiguous memory regions that the destination machine might not have had in common with the first machine prior to the migration may be added to the data structure. In some embodiments, block 616 may correspond to block 506 of FIG. 5. From block 616, flow may proceed to block 618.

In block 618, any updated data (e.g., the data structure of block 616, or any differences to the data structure in connection with block 616) may be transmitted to one or more peer machines. In some embodiments, block 618 may correspond to block 508 of FIG. 5. From block 618, flow may proceed to block 604. The flow from block 618 to block 604 may establish a loop, such that after a first VM migration occurs or is processed, a second VM migration (which may correspond to the first VM) may occur or be processed.

Figure 7:
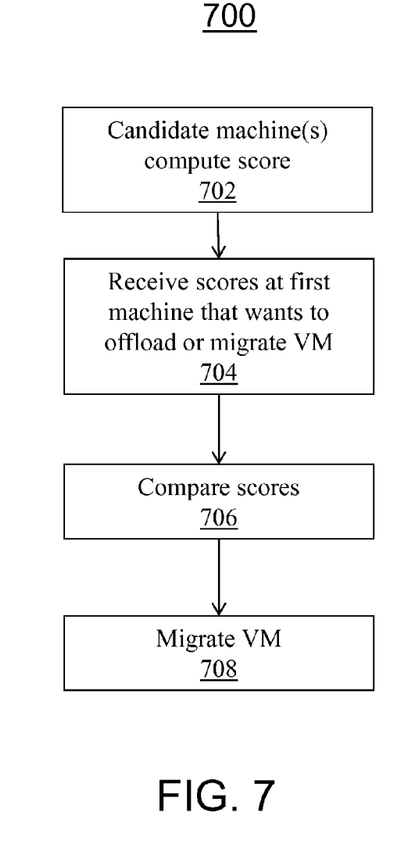
FIG. 7 illustrates a process flow for migrating a virtual machine based on one or more scores in accordance with an embodiment.

Turning now to FIG. 7, a flow chart of an exemplary method 700 in accordance with an embodiment is shown. The method 700 may execute in connection with one or more systems, devices, or components, such as those described herein. In some embodiments, the method 700 may execute in connection with the application 70 of FIG. 3. The method 700 may be used to migrate a VM from a first machine to a second machine.

In block 702, one or more candidate machines may compute a score. The scores may be indicative of how favorable a memory environment is relative to a VM located on a first machine. The scores may be generated in response to an indication that the VM is to be migrated from the first machine.

In block 704, the scores from the candidate machines (which may include the second machine) may be received by the first machine.

In block 706, the first machine (or another machine) may compare the scores received in block 706 to identify or select the second machine as the destination machine for the VM. For example, the second machine may be selected as the destination machine for the VM based on the score for the second machine indicating that the environment is more favorable to the VM on the second machine than any of the other candidate machines.

In block 708, the VM may be migrated from the first machine to the second machine based on the comparison of block 706.

The methods 500, 600, and 700 are illustrative. In some embodiments, one or more operations or blocks (or a portion thereof) may be optional. In some embodiments, one or more blocks may execute in an order or sequence different from what is shown in FIGS. 5-7. In some embodiments, one or more additional blocks not shown may be included. In some embodiments, the methods 500, 600, and 700, or portions thereof, may be combined.

As described above, in some embodiments a representation of data or a data structure may be communicated between two or more machines. A representation of data may refer to the data itself, or a transformed version of the data. For example, in some embodiments a mnemonic (e.g., a name) is used to refer to data, potentially with respect to a given machine. A recipient of the data may be configured to generate the data based on the mnemonic, potentially as opposed to transmitting the actual data over a channel or network. In this manner, greater efficiency may be realized, as processing speed may be faster than communication channel/link speed. Of course, in embodiments where the converse is true (e.g., communication channel/link speed is faster than processing speed), the actual data may be transferred or communicated.

In some embodiments, scores related to data or memory environments may be shared or communicated to one or more machines. The scores may pertain or relate to data at any level of abstraction, such as substrings, strings, pages, etc. The score may reflect a difference between a memory environment on a particular machine (e.g., a first machine) relative to the needs or requirements of a VM to be migrated. A computing device may be configured to aggregate or tabulate the scores in order to facilitate the VM migration from a first machine to at least one additional machine.

A destination machine to serve as a host for a migrating VM may be identified in real-time or substantially in real-time, potentially based on one or more of the scores described above. Calculation and use of the scores may be automated, such that error-prone manual or guesswork types of processes or decisions that are typical of conventional solutions may be avoided. Such automation may ensure that an optimal allocation of computing resources in, e.g., a data center is obtained for a variety of VMs. Such optimal allocation may be achieved over time as one or more VMs are migrated from a first machine to a second machine (and potentially additional machines thereafter).

Technical effects and benefits include preservation of time, bandwidth, power, and processing resources during a machine migration. During a machine migration, replicated contiguous memory regions might not need to be transferred, which may result in the above-noted savings.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
receiving a request from a virtual machine to migrate the virtual machine from a first processor;
responsive to the request, determining a minimum hardware configuration to support the virtual machine;
constructing a list of one or more candidate processors in a work group to migrate the virtual machine to, wherein each of the one more candidate processors supports the minimum hardware configuration;
determining for each of the one or more candidate processors information about shared contiguous memory regions accessible to the one or more candidate processors that is in common to contiguous memory regions accessed by the virtual machine;
selecting a second processor included in the list of one or more candidate processors based on the information indicating that a number of contiguous memory regions accessible to the second processor that are in common to contiguous memory regions accessed by the virtual machine is greater than or equal to a number of contiguous memory regions accessible to each of the other one or more candidate processors that are in common to contiguous memory regions accessed by the virtual machine; and
migrating the virtual machine from the first processor to the second processor based on the determination of the information,
the migrating comprising moving contiguous memory regions that are not in common between the first processor and the second processor.

2. The method of claim 1, wherein the migration is caused by at least one of the first processor, the second processor, and a third processor in the work group.

3. The method of claim 1, further comprising:
updating a data structure associated with the second processor to reflect the migration of the virtual machine to the second processor; and
transmitting the data structure from the second processor to at least one other processor in the work group.

* * * * *